United States Patent

Coleman

[15] 3,649,092
[45] Mar. 14, 1972

[54] MEANS FOR MOUNTING SELF-ALIGNING BEARING

[72] Inventor: Howard R. Coleman, Elyria, Ohio
[73] Assignee: The General Industries Company, Elyria, Ohio
[22] Filed: Jan. 19, 1970
[21] Appl. No.: 3,874

[52] U.S. Cl. ............................................308/72, 267/161
[51] Int. Cl. ....................................................F16c 23/00
[58] Field of Search ...............308/72, 29, 140, 194; 267/161

[56] References Cited

UNITED STATES PATENTS 1,925,671  9/1933  Mansfield ..............................267/161
3,317,256  5/1967  Ernest......................................308/72
3,483,888  12/1969  Wurzel ....................................308/72

FOREIGN PATENTS OR APPLICATIONS 463,551  7/1928  Germany..............................267/161

Primary Examiner—Martin P. Schwadron
Assistant Examiner—Ronald H. Lazarus
Attorney—J. H. Slough

[57] ABSTRACT

There is disclosed herein a spherical type bearing seated at one end on a fixed seat and at the other end on a free-floating seat, the free-floating seat having resilient, radially projecting legs, and there being means to tension the legs to bias the last mentioned seat against the bearing.

6 Claims, 7 Drawing Figures

Patented March 14, 1972
3,649,092
2 Sheets-Sheet 1
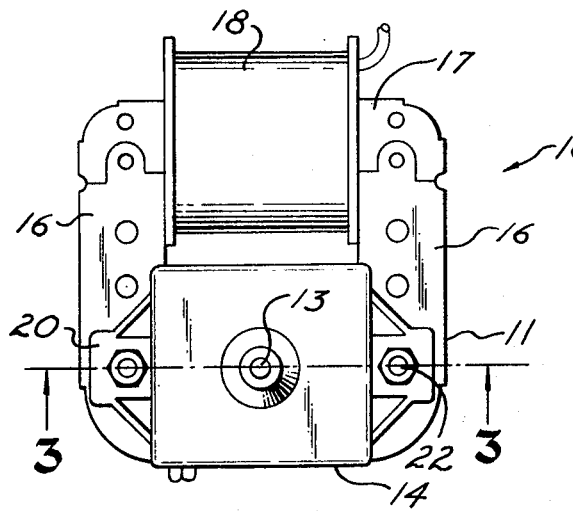
Fig. 1
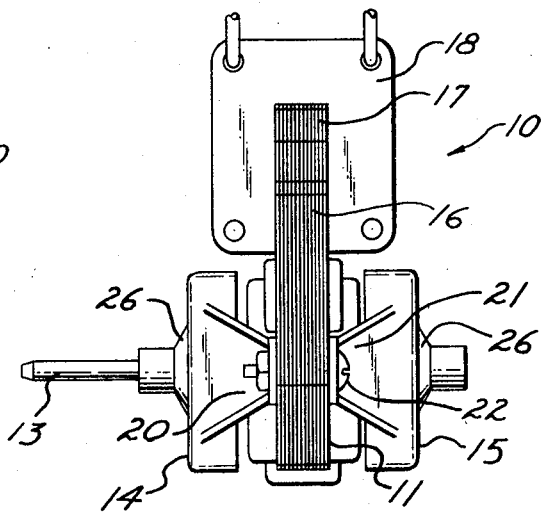
Fig. 2
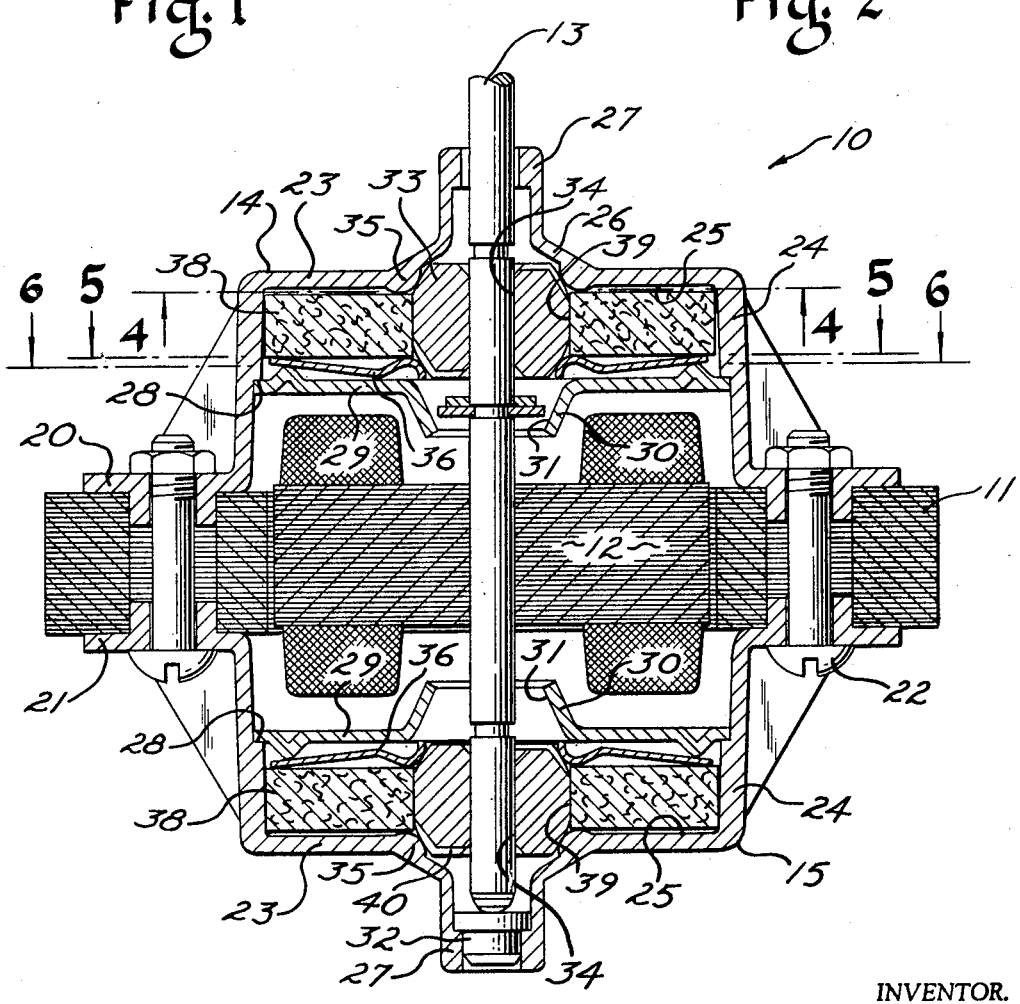
Fig. 3
INVENTOR.
Howard R. Coleman
BY
J. H. SLOUGH
ATTORNEY Patented March 14, 1972

INVENTOR.
Howard R. Coleman
BY
J. H. SLOUGH
ATTORNEY

MEANS FOR MOUNTING SELF-ALIGNING BEARING

This invention relates to means for mounting a self-aligning bearing and to a spring member for seating one end of the bearing.

In the embodiment of the invention herein disclosed, a spherical type self-aligning bearing particularly adapted for use in a fractional horsepower electric motor is retained within a hollow bearing bracket by means of a spring having an annular seat for receiving spherical surface portions at one end of the bearing, the spring including radially projecting, resilient legs adapted to be flexed inwardly of the bracket toward the opposite end of the bearing whereby the annular seat of the spring is constantly biased against the bearing. Means for maintaining pressure on the legs is provided by a retainer plate which overlies the spring and has an inwardly projecting annular boss which presses on outer end portions of the legs.

The general object of this invention is to provide an improved means for mounting a self-aligning bearing wherein the bearing is resiliently held between suitable seating means and is free to adjustably align with a motor shaft.

Yet another object of this invention is to provide mounting means for a self-aligning bearing including a fixed seating means for one end of said bearing and a resilient seating means which floats freely at the other end of said bearing.

Another object of this invention is to provide a spring seating means for the bearing including an annular seat and means disposed outwardly of the seat for biasing the seat against the bearing.

Still another object of this invention is to provide spring seating means as set forth above which is integrally formed of resilient sheet material such as sheet metal.

Another object of this invention is to provide a bearing mounting structure including spring seating means as set forth above disposed within a bearing bracket and having a cover means adapted to hold the spring seating means under tension when the structure is assembled.

A still further object of the invention is to provide mounting means for a self-aligning bearing which is simple and economic to manufacture, composed of but few parts, and is highly efficient and durable in use.

Other objects of the invention and the invention itself will be readily understood from the following description thereof and the accompanying drawings, in which said drawings:

FIG. 1 is a top plane view of an electric motor embodying the bearing mounting means of this invention;

FIG. 2 is a side plan view of the motor of FIG. 1;

FIG. 3 is an enlarged section taken along the line 3—3 of FIG. 1;

Referring now to the drawings in all of which like parts are designated by like reference numerals, the means for mounting a self-aligning bearing is embodied in a small electric motor, but it is anticipated that the same need not be limited to such use.

Figure 4:
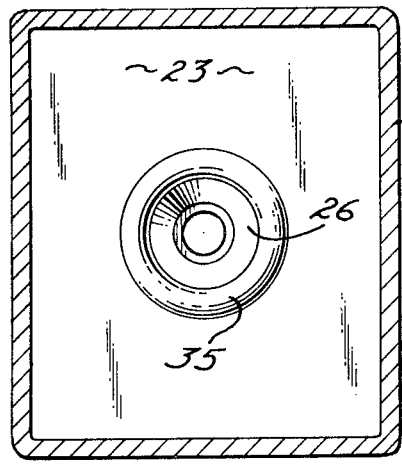
FIG. 4 is a section taken along the line 4—4 of FIG. 3.

In the embodiment as herein disclosed, an electric motor 10 comprises a laminated stator 11, a rotor 12 mounted to a rotor shaft 13, and a pair of rectangular bearing brackets 14 and 15 disposed at the upper and lower ends, respectively, of the motor as viewed in FIG. 3. The stator 11 has a pair of laterally projecting arms 16 connected at their distal ends by a core assembly 17 surrounded by a field including coil 18. The bearing brackets 14 and 15 are provided with laterally projecting mounting portions 20 and 21, respectively, disposed on either side of the laminated stator 11. Bolt and nut assemblies 22 project through suitably aligned openings in the stator and bracket mounting portions to form a housing for the rotor 12.

The bearing brackets 14 and 15 are substantially identical, each having a rectangular outer wall 23 and inwardly projecting side walls 24 which together define a rectangular inner cavity 25. The outer wall 23 has a centrally disposed, outwardly projecting, frustoconical neck 26 terminating in an outwardly projecting collar 27. The side walls 24 are provided with an inner shoulder 28 spaced inwardly from the outer wall 23 and providing a seat for a rigidly fixed retainer plate 29 having a frustoconical central neck 30 affording an opening 31 therethrough. The neck 30 projects in the opposite direction with respect to the neck 26, and the rotor shaft 13 projects through the openings 31 and into the collars 27, the upper end of said shaft projecting outwardly beyond the adjacent collar on the upper bearing bracket 14 and the lower end of said shaft seating on a thrust button 32 mounted within the collar 27 of the lower bearing bracket 15.

The shaft 13 is supported at either end by a spherical type bearing 33 having a central bore 34 adapted to rotatably receive said shaft. Each bearing 33 is seated at its outer end against an annular seat 35 integrally formed in the outer wall 23 adjacent to its juncture with the neck 26. The inner end of each bearing engages a bearing retainer spring 36 having an annular, protuberant seat 37, of generally semicircular cross section in a radial direction, for receiving the end of the bearing. A rectangular, oil-permeable wick 38 made of felt or similar material is seated within each cavity 25 between the outer wall 23 and the bearing retainer spring 36. Each wick 38 has a central opening 39 of circular form whereby the wick closely surrounds the associated bearing 33. It will be understood that the wick 38 is saturated with a suitable lubricating oil whereby the bearing is adequately and continuously lubricated. The bearings 33 are preferably provided at each end with a plurality of radially disposed grooves 40 which extend laterally across the end faces of the bearings and along spherical contacting portions of the bearings adjacent to the ends thereof to afford return flow channels for lubricant to flow from the shaft 13 back to the wick 38.

Figure 5:
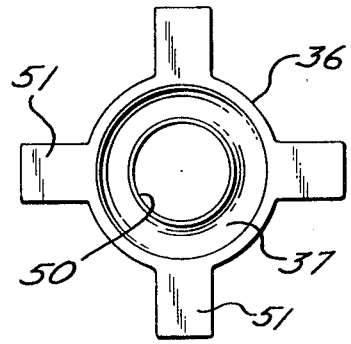
FIG. 5 is a top plan view of a bearing mounting spring as seen from the line 5—5 of FIG. 3.

FIG. 5 shows a detail of the construction of the bearing retainer spring 36. Said retainer is formed of relatively thin-gauge sheet metal characterized by an inherent resilience. In addition to the centrally disposed annular seat 37 which is formed from the sheet metal, and which surrounds a central opening 50, said spring is provided with a plurality of integral, circumferential evenly spaced, radially outwardly projecting legs 51. As herein disclosed, said legs 51 are preferably four in number and provide resilient projections extending outwardly from tee annular seat 37.

Figure 6:
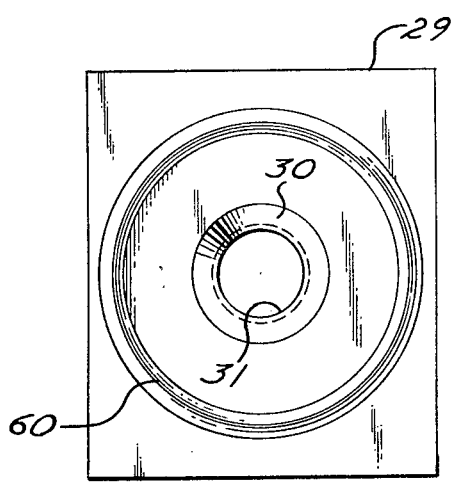
FIG. 6 is a top plan view of a retainer plate as seen from the line 6—6 of FIG. 3.

As shown in FIG. 6, the retainer plate 29 is provided with an annular boss 60 which projects from said retainer plate in the direction opposite to that of the central neck 30. As best seen in FIG. 3, the radius of the annular boss 60 is slightly less than the radial dimension of the legs 51 whereby said boss presses against said legs when the retainer plate 29 is seated on the shoulder 28. The retainer plate 29 is fixedly seated over the cavity 25 in any suitable manner, and as herein illustrated, is wedged or drive fitted between extensions 24' of the side walls 24 which are, in effect, part of the mounting portions 20 and 21.

Figure 7:
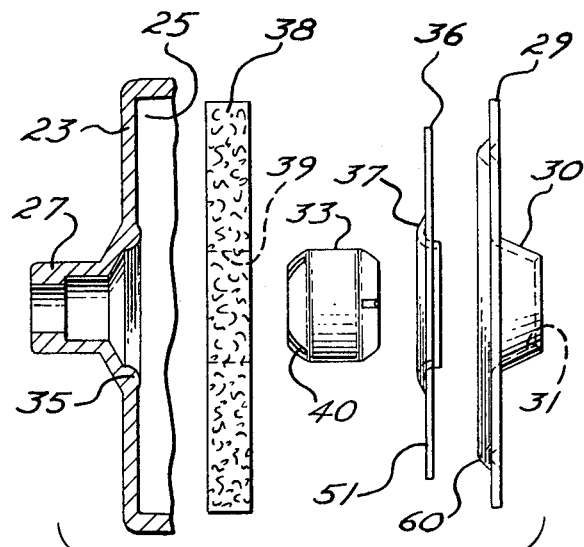
FIG. 7 is an exploded view partly in section and partly in side elevation of the components of the bearing mounting means.

The bearing structure at either end of the rotor shaft 13 is assembled in the manner shown in FIG. 7 wherein a wick 30 is placed into the cavity 25, a bearing 33 is projected through the opening 39 and seated against the annular seat 35, a spring 36 is positioned with its seat 37 engaging the opposite end of said bearing, and the retainer plate 29 is suitably fixed in place whereby the annular boss 60 presses against the legs 51 of the spring to bias the seat 37 resiliently into contact with the bearing 33. Each bearing 33 is thus resiliently held in place between the seats 35 and 37. Both springs 36 and, therefore, the seats 37, float freely within the cavities 25 whereby said bearings can readily adjust to any slight changes in alignment of the shaft, said seats 37 always remaining aligned with one end of said bearing, and said bearings being free to pivot with respect to the fixed seat 35.

It will be understood that many changes in the details of the invention as herein described and illustrated may be made without, however, departing from the spirit thereof or the scope of the appended claims.

I claim:

1. A self-aligning bearing assembly for adjustably aligning shafts within fractional horsepower motors, comprising a bearing bracket having a seat adapted to receive one end of a spherical type bearing; a spherical type bearing having a central bore adapted to receive a motor shaft, one end of said bearing seated on the seat of said bracket; a bearing retainer spring having a central opening, an annular seat around said opening engaging the opposite end of said bearing, and a plurality of evenly spaced integral resilient legs extending radially outwardly from the annular seat; and a retainer member disposed over said bearing retainer spring and having an annular boss pressing against a portion of said resilient legs adjacent to the ends thereof whereby said annular seat is biased into contact with said opposite end of said bearing.

2. A self-aligning bearing assembly as set forth in claim 1: said bearing retainer spring being integrally formed of spring sheet metal; said annular seat being of generally semicircular cross section in a radial direction whereby said annular seat protrudes from the plane of said bearing retainer spring and engages spherical surface portions adjacent to said opposite end of said bearing.

3. A self-aligning bearing assembly as set forth in claim 2: said bearing retainer spring having at least four circumferentially evenly spaced legs.

4. A self-aligning bearing assembly as set forth in claim 2: said retainer member comprising a plate; said plate having an annular boss protruding from one side thereof into contact with outer end portions of said legs whereby said legs are tensioned to bias said bearing.

5. A bearing retainer spring for seating one end of a spherical bearing within a fractional horsepower motor, said spring bearing integrally formed of spring sheet metal; said spring comprising a central, annular seat for engaging spherical surface portions of a bearing, said seat being of generally semicircular cross section in a radial direction whereby said annular seat protrudes from the plane of said spring to engage the bearing; a plurality of evenly spaced radially outwardly projecting, flat, integral legs carried around the outer periphery of said seat, said legs adapted to be flexed in an axial direction to bias said annular seat into constant contact with the bearing.

6. In a self-aligning bearing assembly, means for retaining one end of a spherical type bearing comprising a bearing retainer spring integrally formed of spring sheet metal; said spring comprising a central, annular seat for engaging surface portions of the bearing, said seat being of generally semicircular cross section in a radial direction whereby said annular seat protrudes from the plane of said spring to engage the bearing; a plurality of evenly spaced radially outwardly projecting, flat, integral legs carried around the outer periphery of said seat; a fixed retainer plate disposed over said spring and having an annular boss protruding from one side thereof into contact with outer end portions of said legs whereby said legs are tensioned to bias said annular seat against the bearing.

* * * * *